United States Patent
Kurata

(10) Patent No.: US 12,367,863 B2
(45) Date of Patent: Jul. 22, 2025

(54) EXTERNAL LANGUAGE MODEL INFORMATION INTEGRATED INTO NEURAL TRANSDUCER MODEL

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 301 days.

(21) Appl. No.: 17/580,878

(22) Filed: Jan. 21, 2022

(65) Prior Publication Data

US 2023/0237989 A1 Jul. 27, 2023

(51) Int. Cl.
| | |
|---|---|
| G10L 15/06 | (2013.01) |
| G06N 3/04 | (2023.01) |
| G06N 3/096 | (2023.01) |
| G10L 15/16 | (2006.01) |
| G10L 15/183 | (2013.01) |
| G10L 15/22 | (2006.01) |

(52) U.S. Cl.
CPC .............. *G10L 15/063* (2013.01); *G06N 3/04* (2013.01); *G10L 15/16* (2013.01); *G10L 15/183* (2013.01); *G10L 15/22* (2013.01)

(58) Field of Classification Search
CPC ..... G10L 15/063; G10L 15/16; G10L 15/183; G10L 15/22; G06N 3/04; G06N 3/044; G06N 3/0455; G06N 3/047; G06N 3/096
See application file for complete search history.

(56) References Cited

U.S. PATENT DOCUMENTS

| | | | | |
|---|---|---|---|---|
| 2019/0318755 | A1* | 10/2019 | Tashev | G06N 3/045 |
| 2020/0327881 | A1* | 10/2020 | Kurata | G10L 15/16 |
| 2021/0334955 | A1* | 10/2021 | Roth | G06T 7/0012 |

(Continued)

FOREIGN PATENT DOCUMENTS

| | | |
|---|---|---|
| CN | 113516968 A | 5/2022 |
| WO | 2021113443 A1 | 6/2021 |
| WO | 2021162779 A1 | 8/2021 |

OTHER PUBLICATIONS

Bo-June Hsu, "Generalized linear interpolation of language models," 2007 IEEE Workshop on Automatic Speech Recognition & Understanding (ASRU), Kyoto, Japan, 2007, pp. 136-140, doi: 10.1109/ASRU.2007.4430098. (Year: 2007).*

(Continued)

*Primary Examiner* — Daniel C Washburn
*Assistant Examiner* — Penny L Caudle
(74) *Attorney, Agent, or Firm* — Tutunjian & Bitetto, P.C.; Robert Richard Aragona

(57) ABSTRACT

A computer-implemented method for training a neural transducer is provided including, by using audio data and transcription data of the audio data as input data, obtaining outputs from a trained language model and a seed neural transducer, respectively, combining the outputs to obtain a supervisory output, and updating parameters of another neural transducer in training so that its output is close to the supervisory output. The neural transducer can be a Recurrent Neural Network Transducer (RNN-T).

17 Claims, 8 Drawing Sheets

(56) References Cited

U.S. PATENT DOCUMENTS

2022/0139380 A1* 5/2022 Meng .................. G06N 3/044 704/232

OTHER PUBLICATIONS

Zeyer et al., "A New Training Pipeline for an Improved Neural Transducer", arXiv preprint arXiv:2005.09319. May 19, 2020, pp. 1-5.
Hu et al., "Exploring Pre-Training With Alignments for RNN Transducer Based End-to-End Speech Recognition", InICASSP 2020-2020 IEEE International Conference on Acoustics, Speech and Signal Processing (ICASSP) May 4, 2020 (pp. 7079-7083). IEEE.
Kim et al., "Improved Neural Language Model Fusion for Streaming Recurrent Neural Network Transducer", arXiv:2010.13878v1 [cs.CL] Oct. 26, 2020, pp. 1-5.
Li et al., "Improving RNN Transducer Modeling for End-to-End Speech Recognition", arXiv:1909.12415v1 [cs.CL] Sep. 26, 2019, pp. 1-9.
Meng et al., "Internal Language Model Training for Domain-Adaptive End-to-End Speech Recognition", arXiv:2102.01380v2 [eess.AS] Apr. 22, 2021, pp. 1-5.
Cui et al., "Reducing Exposure Bias in Training Recurrent Neural Network Transducers", arXiv:2108.10803v1 [cs.CL] Aug. 24, 2021, pp. 1-5.
Meng, Z., Wu, Y., Kanda, N., Lu, L., Chen, X., Ye, G., . . . & Gong, Y. (Jun. 4, 2021). Minimum word error rate training with language model fusion for end-to-end speech recognition. arXiv preprint arXiv:2106.02302.
Stahlberg, F., Cross, J., & Stoyanov, V. (Sep. 1, 2018). Simple fusion: Return of the language model. arXiv preprint arXiv:1809. 00125.
Kurata, G., & Saon, G. (Oct. 25, 2020). Knowledge Distillation from Offline to Streaming RNN Transducer for End-to-End Speech Recognition. In Interspeech (pp. 2117-2121).
Yang, X., Li, Q., & Woodland, P. C. (May 23, 2022). Knowledge distillation for neural transducers from large self-supervised pre-trained models. In ICASSP 2022-2022 IEEE International Conference on Acoustics, Speech and Signal Processing (ICASSP) (pp. 8527-8531). IEEE.
International Search Report from PCT/EP2023/050846 dated Mar. 22, 2023. (12 pages).

* cited by examiner

EXTERNAL LANGUAGE MODEL INFORMATION INTEGRATED INTO NEURAL TRANSDUCER MODEL

BACKGROUND

The present invention relates generally to machine learning, and more specifically, to methods and systems for integrating external language model information into a neural transducer model, such as, e.g., a recurrent neural network transducer (RNN-T) model, for end-to-end speech recognition.

End-to-end models for automatic speech recognition (ASR) have gained popularity in recent years as a way to fold separate components of a conventional ASR system (e.g., acoustic, pronunciation and language models) into a single neural network. Examples of such models include connectionist temporal classification (CTC) based models, recurrent neural network transducer (RNN-T) models, and attention-based seq2seq models. Among these models, RNN-T is the most suitable streaming end-to-end recognizer, which has shown competitive performance compared to conventional systems.

SUMMARY

In accordance with an embodiment, a computer-implemented method for training a neural transducer is provided. The computer-implemented method includes, by using audio data and transcription data of the audio data as input data, obtaining outputs from a trained language model and a seed neural transducer, respectively, combining the outputs to obtain a supervisory output, and updating parameters of another neural transducer in training so that its output is close to the supervisory output.

In accordance with another embodiment, a computer program product for training a neural transducer is provided. The computer program product includes a computer readable storage medium having program instructions embodied therewith, the program instructions executable by a computer to cause the computer to, by using audio data and transcription data of the audio data as input data, obtain outputs from a trained language model and a seed neural transducer, respectively, combine the outputs to obtain a supervisory output, and update parameters of another neural transducer in training so that its output is close to the supervisory output.

In accordance with yet another embodiment, a system for training a neural transducer is provided. The system includes a memory and one or more processors in communication with the memory configured to, by using audio data and transcription data of the audio data as input data, obtain outputs from a trained language model and a seed neural transducer, respectively, combine the outputs to obtain a supervisory output, and update parameters of another neural transducer in training so that its output is close to the supervisory output.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
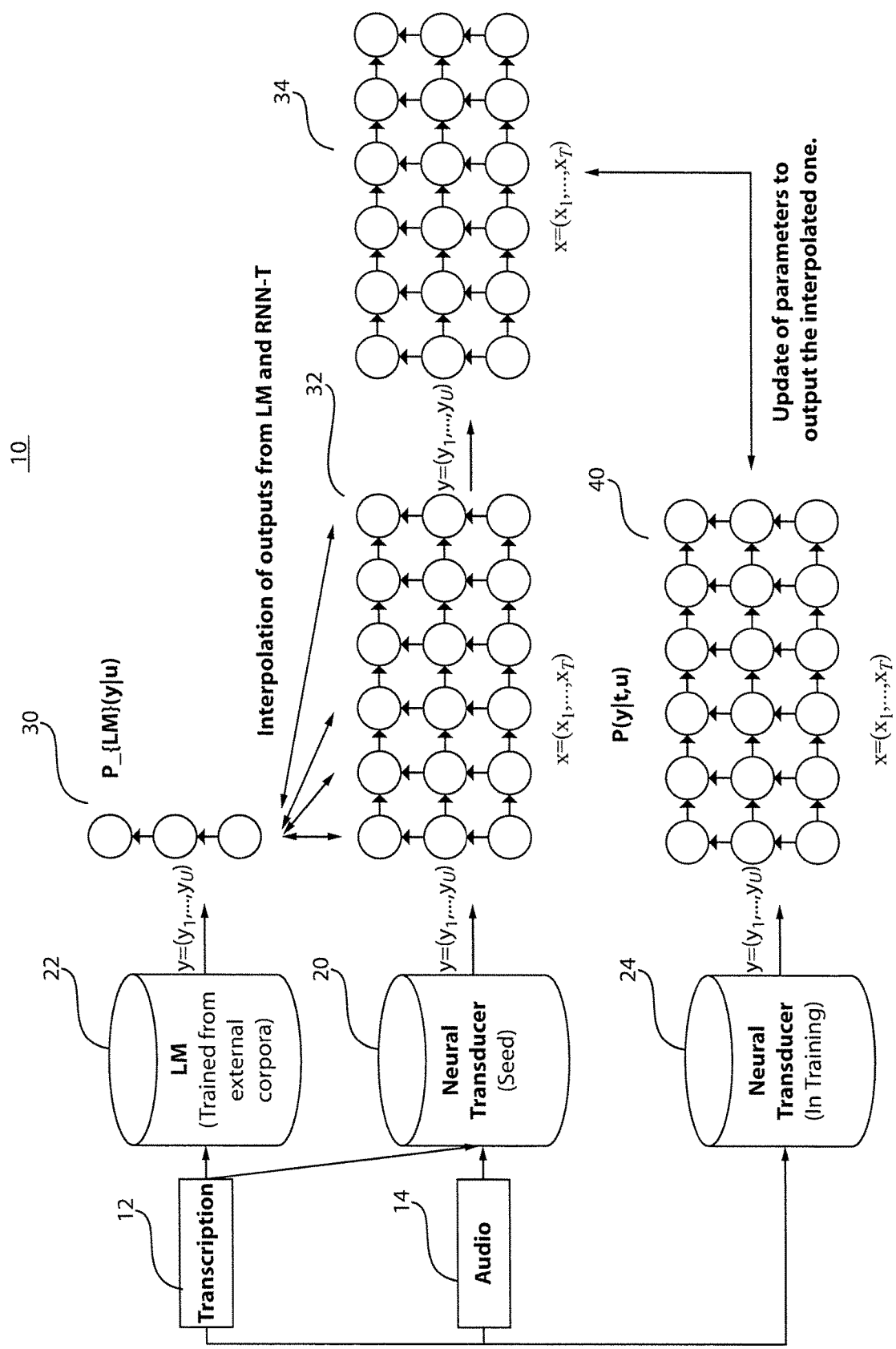
FIG. 1 is a block/flow diagram of an exemplary system for integrating external language model (LM) information into a neural transducer model, such as, e.g., a recurrent neural network transducer (RNN-T), in accordance with an embodiment of the present invention.

Embodiments in accordance with the present invention provide methods and devices for improving neural transducer models by using posteriors from external language models (LMs).

Before delving into the recurrent neural network transducer (RNN-T), speech recognition continues to evolve. New speech recognition architectures or improvements to existing architectures continue to be developed that seek to increase the quality of ASR systems. To illustrate, speech recognition initially employed multiple models where each model had a dedicated purpose. For instance, an ASR system included an acoustic model (AM), a pronunciation model (PM), and a language model (LM). The acoustic model mapped segments of audio (e.g., frames of audio) to phonemes. The pronunciation model connected these phonemes together to form words while the language model was used to express the likelihood of given phrases (e.g., the probability of a sequence of words). Yet although these individual models worked together, each model was trained independently and often manually designed on different datasets.

The approach of separate models enabled a speech recognition system to be fairly accurate, especially when the training corpus (e.g., body of training data) for a given model caters to the effectiveness of the model, but needing to independently train separate models introduced its own complexities and led to an architecture with integrated models. These integrated models sought to use a single neural network to directly map an audio waveform (e.g., input sequence) to an output sentence (e.g., output sequence). This resulted in a sequence-to-sequence approach, which generated a sequence of words (or graphemes) when given a sequence of audio features. Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a word piece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Although early E2E models proved accurate and a training improvement over individually trained models, these E2E models, such as the LAS model, functioned by reviewing an entire input sequence before generating output text, and thus, did not allow streaming outputs as inputs were received. Without streaming capabilities, an LAS model is unable to perform real-time voice transcription. Due to this deficiency, deploying the LAS model for speech applications that are latency sensitive or require real-time voice transcription may pose issues.

Additionally, speech recognition systems that have acoustic, pronunciation, and language models, or such models composed together, may rely on a decoder that has to search a relatively large search graph associated with these models. With a large search graph, it is not conducive to host this type of speech recognition system entirely on-device. Here, when a speech recognition system is hosted "on-device," a device that receives the audio input uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model.

Unfortunately, being reliant upon a remote connection makes a speech recognition system vulnerable to latency issues and/or inherent unreliability of communication networks. To improve the usefulness of speech recognition by avoiding these issues, speech recognition systems again evolved into a form of a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken.

Accordingly, a need exists for more efficient processes for improving speech recognition accuracy. The exemplary embodiments of the present invention introduce a method that improves neural transducer models (e.g., RNN-T) by using posteriors from external language models (LMs)

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is a block/flow diagram of an exemplary system 10 for integrating external language model (LM) information into a neural transducer model, such as, e.g., a recurrent neural network transducer (RNN-T), in accordance with an embodiment of the present invention.

The exemplary embodiments introduce a system 10 where the language model probability $P\_\{LM\}(y|u)$ is combined for each $P(y|t,u)$ in the posterior lattice. Thus, for any time index, the LM probability given the preceding output symbols is the same. As a result, the same $P\_\{LM\}(y|u)$ can be combined with $P(y|t,u)$ for all time indexes t with the same u. Then, the combined probability is used as a teacher to train a neural transducer model.

In particular, with reference to FIG. 1, an arbitrary type of language model 22 is trained from a huge amount of text data (e.g., external corpora). By using audio data 14 and its transcription data 12, $P(y|t,u)$ (40) in the posterior lattice is calculated from a seed neural transducer model 20. Then, the language model probability $P\_\{LM\}(y|u)$ (30) is calculated with the trained language model 24, and $P(y|t,u)$ (40) and $P\_\{LM\}(y|u)$ (30) are combined by using, e.g., a linear or log-linear interpolation. The parameters of the neural transducer model 24 are updated (34) by minimizing the KL divergence or mean square error between the output from the neural transducer model in training (24) and the calculated interpolated output (32).

The advantages of the present invention include at least better speech recognition accuracy where the neural transducer model itself is trained to yield the interpolated outputs of the seed neural transducer model and the external language model.

Figure 2:
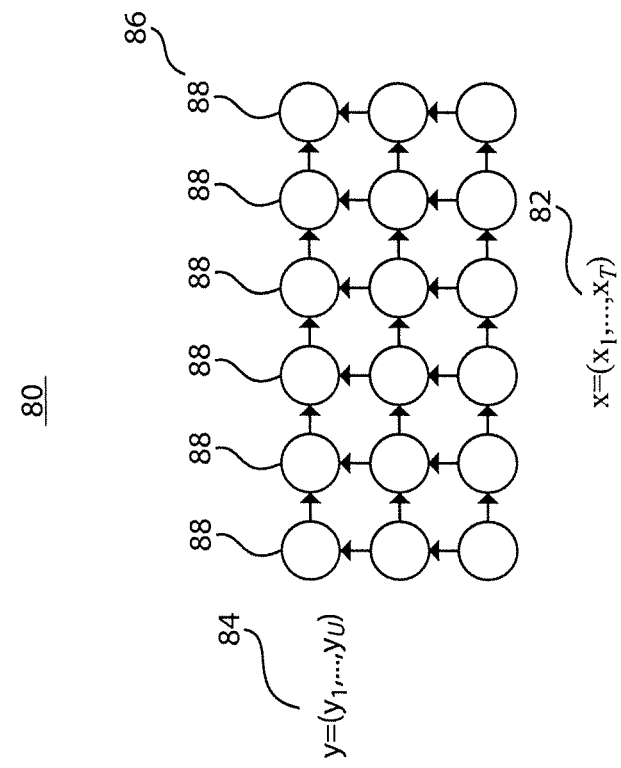
FIG. 2 is a block/flow diagram of an exemplary neural transducer architecture and output probability lattice.
Figure 2:
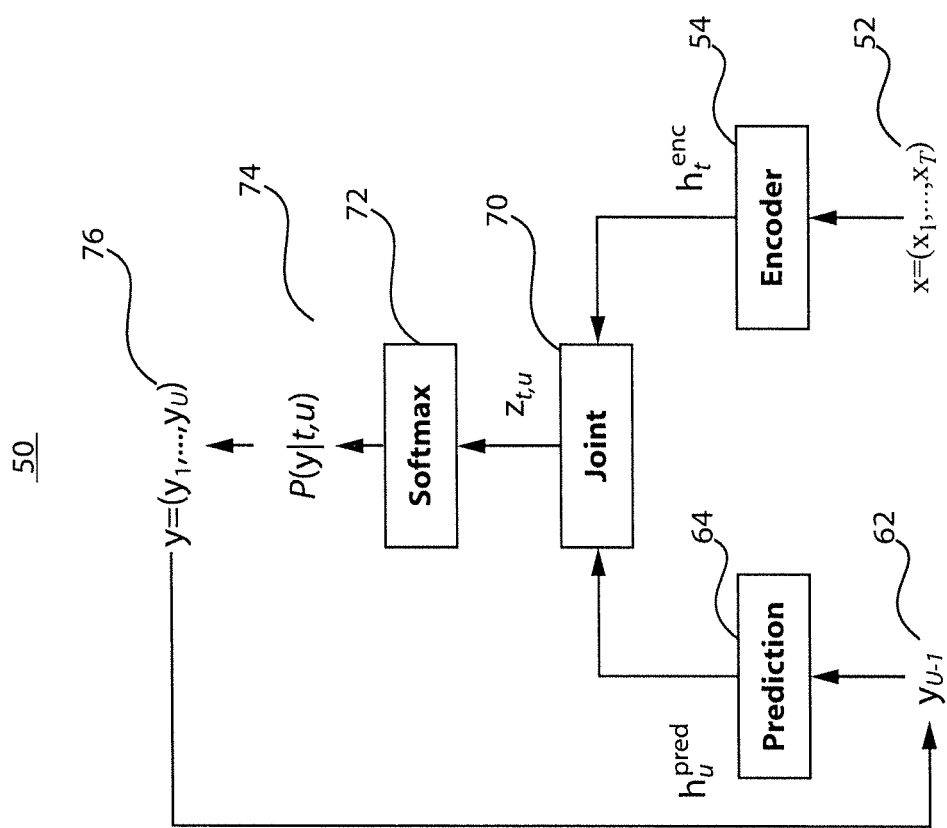

FIG. 2 is a block/flow diagram of an exemplary neural transducer architecture and output probability lattice.

The neural transducer architecture can be, e.g., an RNN-T model 50, which includes an encoder (or encoder network) 54, prediction (or prediction network) 64, and joint networks

70. The encoder network 54 is analogous to the acoustic model, which converts the acoustic feature $x_t$ into a high-level representation $h_t^{enc}$, where t is a time index. The prediction network 64 works like an RNN language model, which produces a high-level representation $h_u^{pre}$ by conditioning on the previous non-blank target $y_{u-1}$ (62) predicted by the RNN-T model, where u is an output label index.

The joint network 70 is a feed-forward network that combines the encoder network output $h_t^{enc}$ and the prediction network output $h_u^{pre}$. The final posterior for each output token k is obtained after applying softmax operation 72:

$$P(k|t,u) = \text{softmax}(h_{t,u}^k)$$

The loss function of RNN-T is the negative log posterior of output label sequence y given input acoustic feature x:

$$L = -\ln P(y|x)$$

Thus, in accordance with the RNN-T model 50, a neural transducer generates an output sequence y, based on an input feature sequence x, by a search over an output probability lattice defined by P(y|t, u) (74). $x=(x_1, \ldots x_T)$ is an input sequence 52 of audio feature vectors, $y=(y_1, \ldots y_U)$ is a sequence 76 of previous tokens, and z{t, u} are logits.

For the output probability lattice 80, each node 88 represents a softmax of z_{t, u}.

Figure 3:
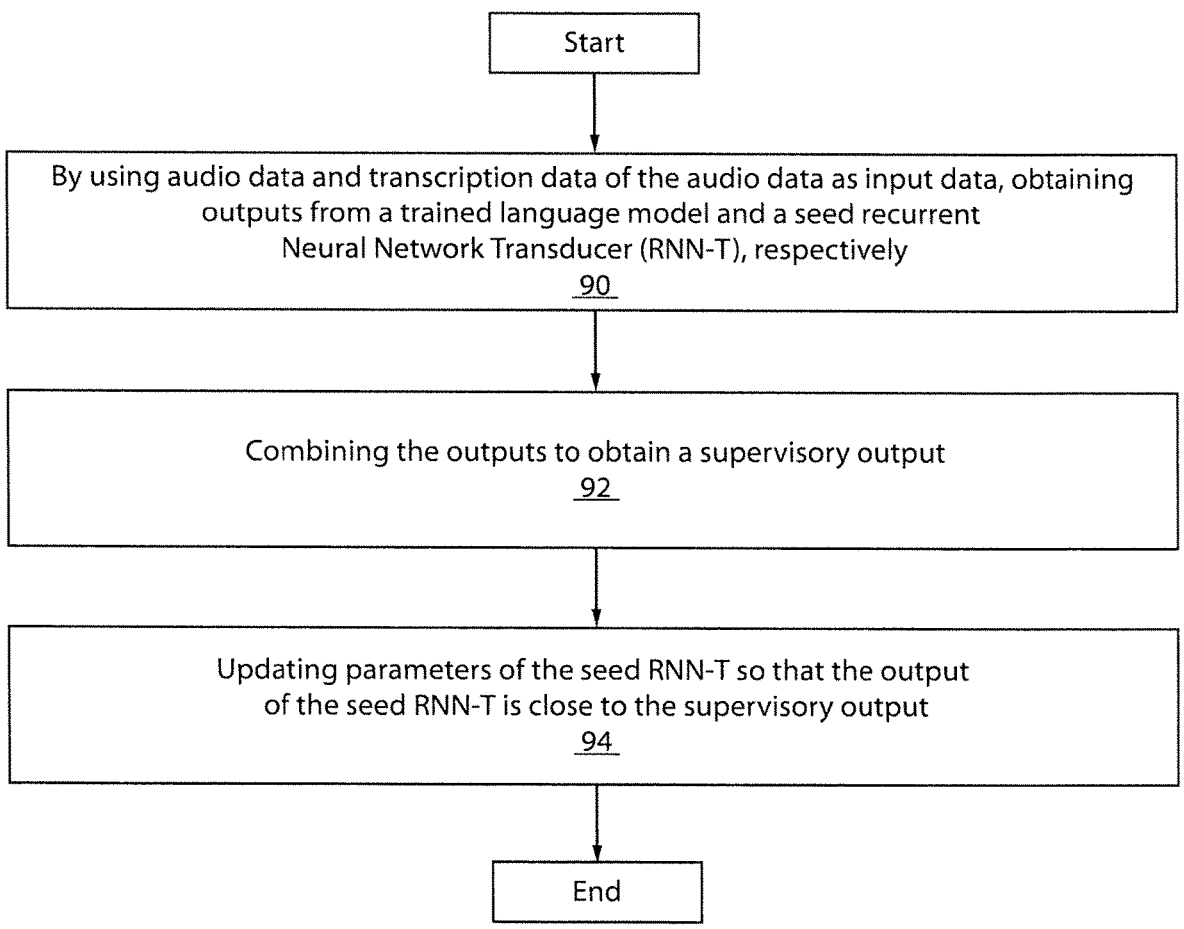
FIG. 3 is a block/flow diagram of a method for training a neural transducer by integrating the external language model (LM), in accordance with an embodiment of the present invention.

FIG. 3 is a block/flow diagram of a method for training a neural transducer by integrating the external language model (LM), in accordance with an embodiment of the present invention.

At block 90, by using audio data and transcription data of the audio data as input data, obtain outputs from a trained language model and a seed neural transducer, such as, e.g., a RNN-T, respectively.

At block 92, combine the outputs to obtain a supervisory output.

At block 94, update parameters of another neural transducer in training so that its output is close to the supervisory output. Stated differently, the output from the another neural transducer in training approaches or approximates the supervisory output. The seed neural transducer 20 (FIG. 1) is fixed. A new neural transducer 24 (FIG. 1) is trained from scratch (random values) or initialized by the seed model. It is noted that the seed neural transducer is different than the neural transducer in training.

Figure 4:
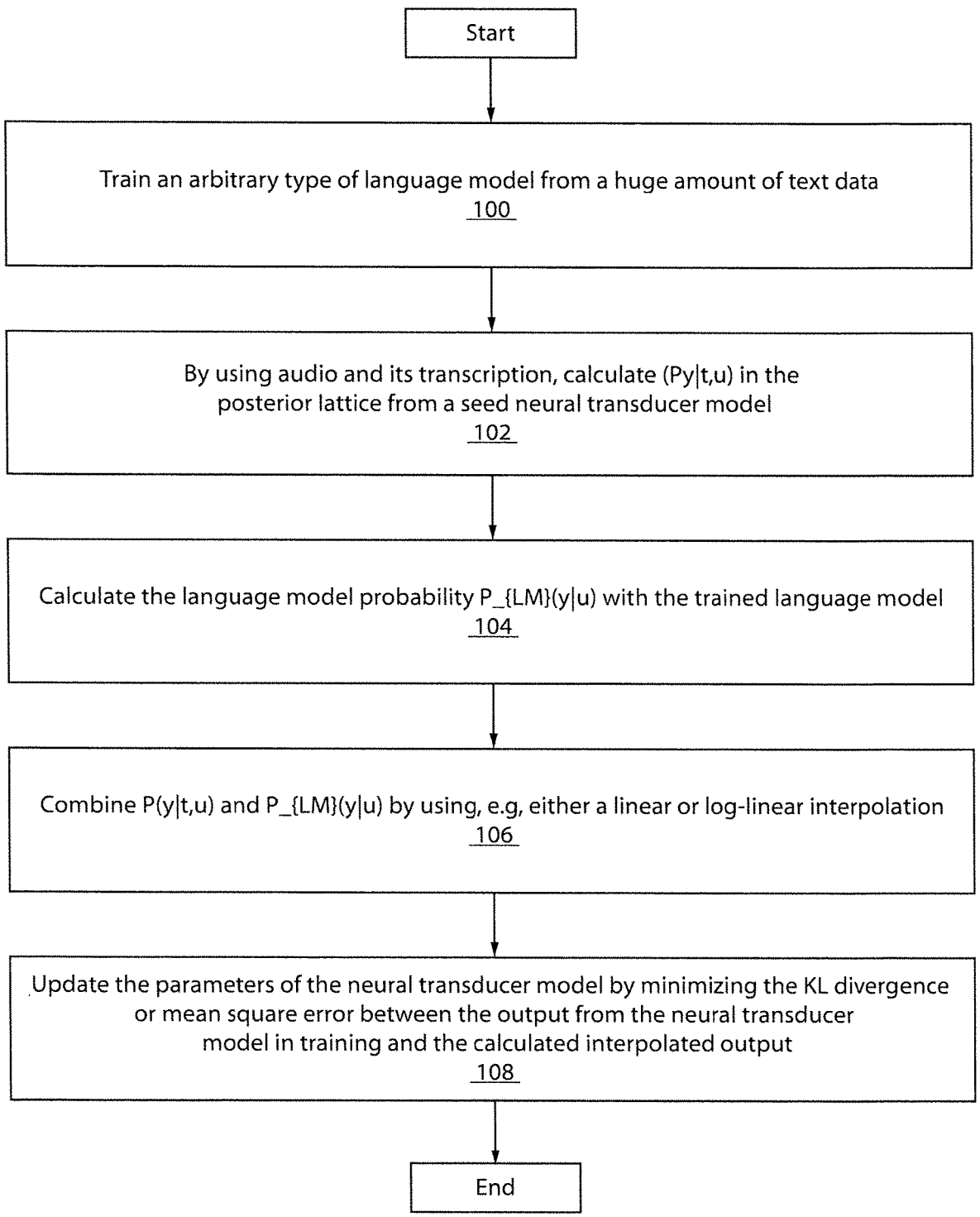
FIG. 4 is a block/flow diagram of an exemplary method for integrating external LM information into a neural transducer model, such as RNN-T, in accordance with an embodiment of the present invention.

FIG. 4 is a block/flow diagram of an exemplary method for integrating external language model (LM) information into a neural transducer model, such as RNN-T, in accordance with an embodiment of the present invention.

At block 100, train an arbitrary type of language model from a huge amount of text data.

At block 102, by using audio and its transcription, calculate P(y|t,u) in the posterior lattice from a seed neural transducer model.

At block 104, calculate the language model probability P_{LM}(y|u) with the trained language model.

At block 106, combine P(y|t,u) and P_{LM}(y|u) by using, e.g., either a linear or log-linear interpolation.

At block 108, update the parameters of the neural transducer model by minimizing the KL divergence or mean square error between the output from the neural transducer model in training and the calculated interpolated output. As noted above, the seed neural transducer 20 (FIG. 1) is fixed. A new neural transducer 24 (FIG. 1) is trained from scratch (random values) or initialized by the seed model. It is noted that the seed neural transducer is different than the neural transducer in training.

Figure 5:
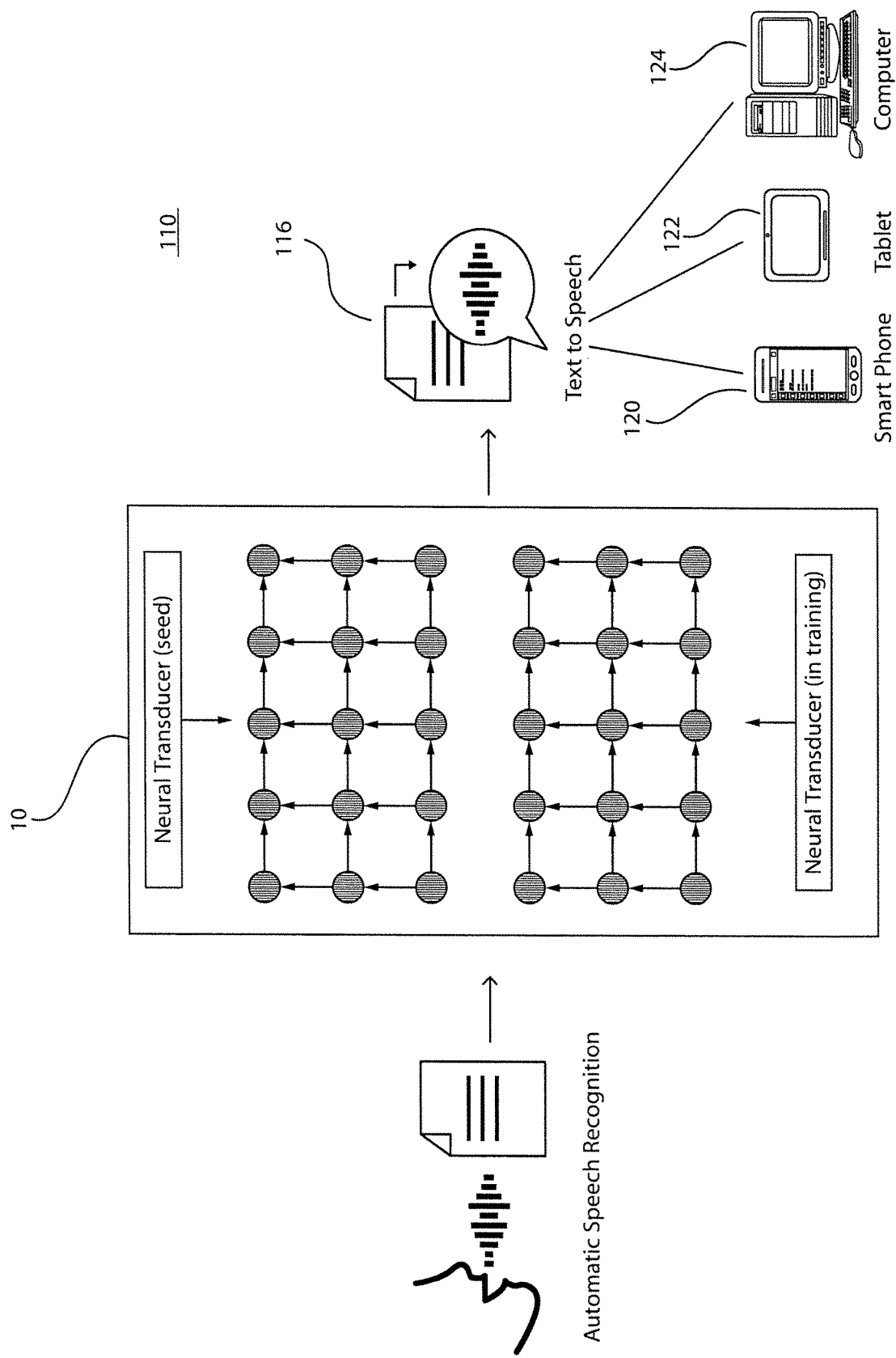
FIG. 5 illustrates a practical application of how the neural transducer is used with automatic speech recognition (ASR) for speech-to-text conversion, in accordance with an embodiment of the present invention.

FIG. 5 illustrates a practical application 110 of how the RNN-T is used with automatic speech recognition (ASR) for speech-to-text conversion, in accordance with an embodiment of the present invention.

In simple terms, conversational artificial intelligence (AI) is the use of natural language to communicate with machines. Deep learning applications in conversational AI are growing every day, from voice assistants and chatbots, to question answering systems that enable customer self-service. The range of industries adapting conversational AI into their solutions are wide, and have diverse domains extending from finance to healthcare. Conversational AI is a complex system that integrates multiple deep neural networks that must work seamlessly and in unison to deliver a delightful user experience with accurate, fast and natural human-to-machine interaction. To achieve these goals, developers are developing applications that solve key problems like accomplishing domain adaptation, user analytics, compliance, high accuracy voice recognition, user identification, sentiment analysis, among others.

A conversational AI application uses three subsystems to perform the steps of processing and transcribing the audio, understanding (deriving meaning) of the question asked, generating the response (text) and speaking the response back to the human. These steps are achieved by multiple deep learning solutions working together. First, automatic speech recognition (ASR) system 112 is used to process the raw audio signal and transcribe text from it. Second, natural language processing (NLP) is used to derive meaning from the transcribed text (ASR output). In the instant case, the seed neural transducer 20 (FIG. 1) is fixed. The new neural transducer 24 (FIG. 1) is trained from scratch (random values) or initialized by the seed model. It is noted that the seed neural transducer is different than the neural transducer in training. Last, speech synthesis or speech-to-text 116 is used for the production text. The produced text can be displayed on, e.g., a smart phone 120, a tablet 122, and/or a computer 124. As a result, the exemplary system 10 can be implemented in ASR 112 to produce text from speech 116 as an exemplary practical application.

Figure 6:
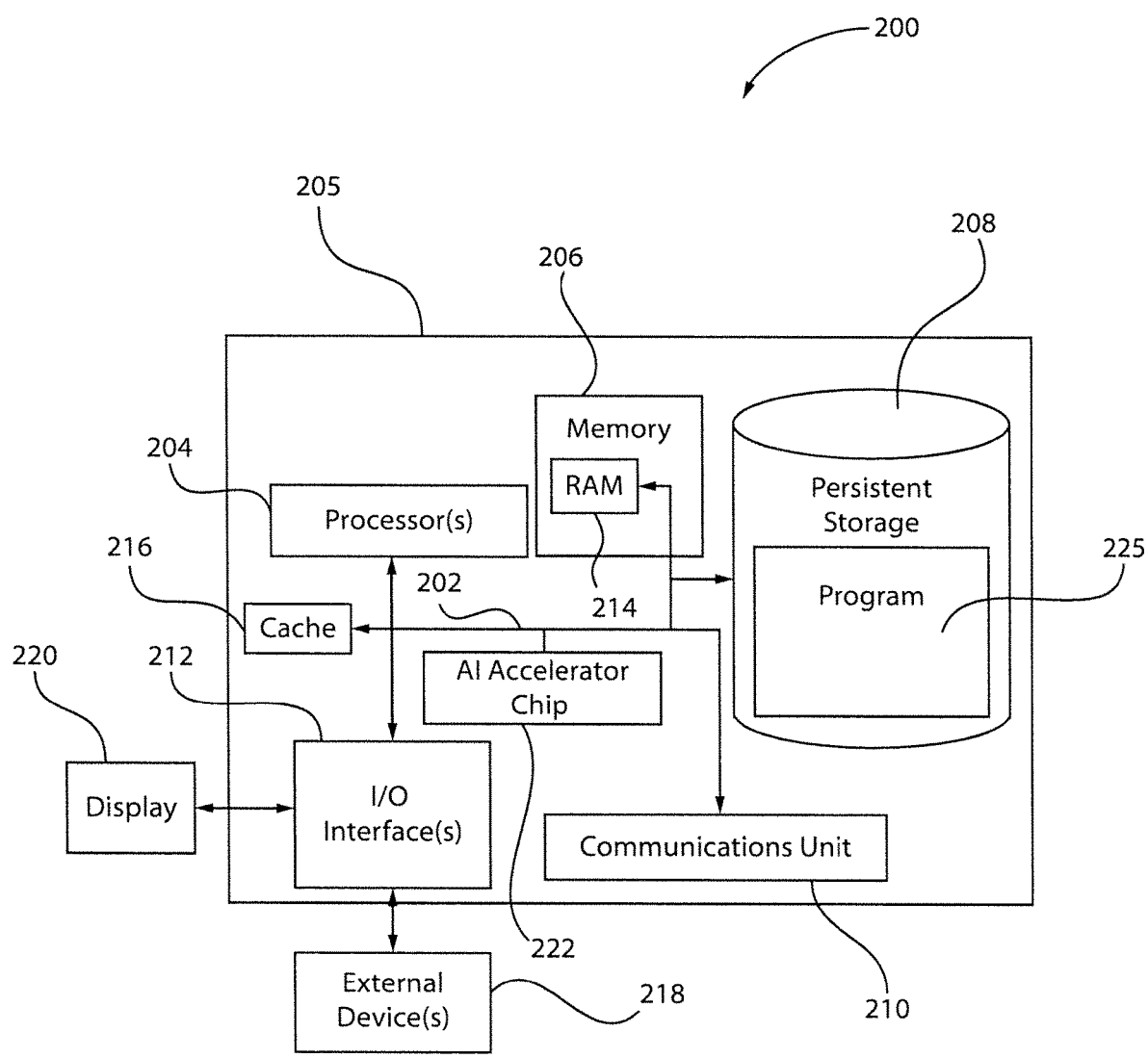
FIG. 6 is a block/flow diagram of an exemplary processing system for integrating external LM information into a neural transducer model, such as RNN-T, in accordance with an embodiment of the present invention.

FIG. 6 is a block/flow diagram of an exemplary processing system for preparing training data for a speech recognition model, in accordance with an embodiment of the present invention.

FIG. 6 depicts a block diagram of components of system 200, which includes computing device 205. It should be appreciated that FIG. 6 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (for integrating external language model information into a neural transducer model, such as, e.g., a recurrent neural network transducer (RNN-T) model, for end-to-end speech recognition) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 7:
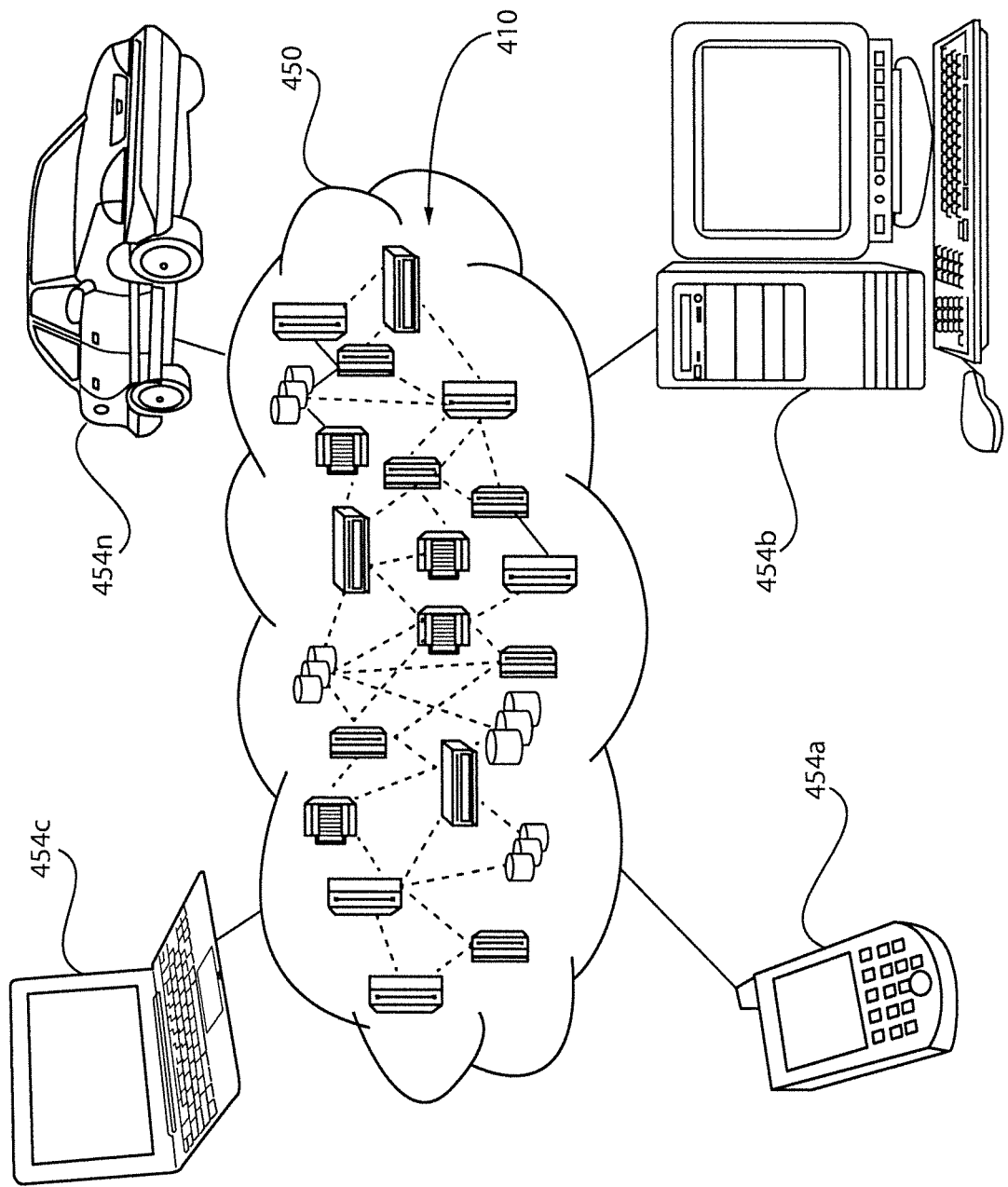
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 7 are intended to be illustrative only and that computing nodes 410 and cloud computing environment 450 can communicate with any type of computerized device over any type of network and/or network addressable connection (e.g., using a web browser).

Figure 8:
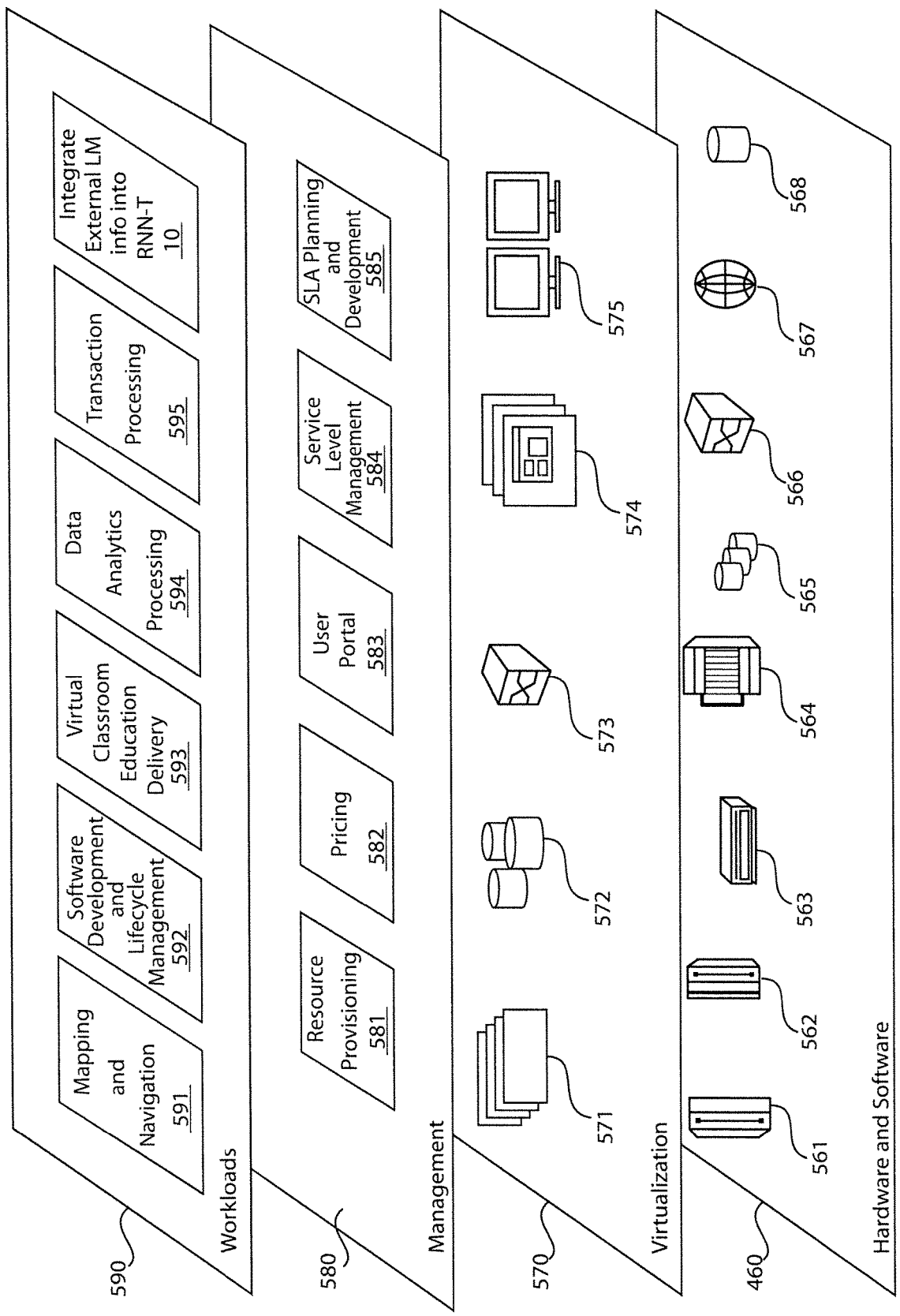
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and system 10 for integrating external LM information into a neural transducer, such as, e.g., RNN-T.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of methods and systems for integrating external language model information into a neural transducer model, such as an RNN-T model, for end-to-end speech recognition (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for training a neural transducer, the method comprising:
by using audio data and transcription data of the audio data as input data, obtaining a probability output and a posterior lattice output from a trained language model and a pre-trained seed neural transducer having frozen weights, respectively;
combining the probability output from the trained language model into the posterior lattice output of the pre-trained seed neural transducer to obtain a calculated log-linear interpolated output as a supervisory output; and updating parameters of a neural transducer in training, a Recurrent Neural Network Transducer (RNN-T), so that its posterior lattice output is close to the supervisory output.

2. The computer-implemented method of claim 1, wherein a horizontal axis of the posterior lattice output is time index t, a vertical axis of the posterior lattice output is symbol u in the transcription data, and each node at t, u in the posterior lattice output represents a posterior of having an output of first u elements of an output sequence by point t in a transcription sequence.

3. The computer-implemented method of claim 2, wherein the combining of the outputs includes combining a same output of the trained language model with the posterior for all time indexes with a same u.

4. A computer program product, comprising a computer readable storage medium including program instructions, for training a neural transducer, the program instructions executable by a computer to cause the computer to:
by using audio data and transcription data of the audio data as input data, obtain a probability output and a posterior lattice output from a trained language model and a pre-trained seed neural transducer having frozen weights, respectively;
combine the probability output from the trained language model into the posterior lattice output of the pre-trained seed neural transducer to obtain a calculated log-linear interpolated output as a supervisory output; and
update parameters of a neural transducer in training, a Recurrent Neural Network Transducer (RNN-T), so that its posterior lattice output is close to the supervisory output.

5. The computer program product of claim 4, wherein a horizontal axis of the posterior lattice output is time index t, a vertical axis of the posterior lattice output is symbol u in the transcription data, and each node at t, u in the posterior lattice output represents a posterior of having an output of first u elements of an output sequence by point t in a transcription sequence.

6. The computer program product of claim 5, wherein the combining of the outputs includes combining a same output of the trained language model with the posterior for all time indexes with a same u.

7. A system for preparing training data for training a neural transducer, the system comprising:
a memory; and
one or more processors in communication with the memory configured to:
by using audio data and transcription data of the audio data as input data, obtain a probability output and a posterior lattice output from a trained language model and a pre-trained seed neural transducer having frozen weights, respectively;
combine the probability output from the trained language model into the posterior lattice output of the pre-trained seed neural transducer to obtain a calculated log-linear interpolated output as a supervisory output; and
update parameters of a neural transducer in training, a Recurrent Neural Network Transducer (RNN-T), so that its posterior lattice output is close to the supervisory output.

8. The system of claim 7, wherein a horizontal axis of the posterior lattice output is time index t, a vertical axis of the posterior lattice output is symbol u in the transcription data, and each node at t, u in the posterior lattice output represents a posterior of having an output of first u elements of an output sequence by point t in a transcription sequence and wherein the combining of the outputs includes combining a same output of the trained language model with the posterior for all time indexes with a same u.

9. The computer-implemented method of claim 1, wherein the updating parameters is performed by minimizing a Kullback-Leibler (KL) divergence between the output from the neural transducer in training and the supervisory output.

10. The computer-implemented method of claim 1, wherein the updating parameters is performed by minimizing a mean square error between the output from the neural transducer in training and the supervisory output.

11. The computer program product of claim 4, wherein the updating parameters is performed by minimizing a Kullback-Leibler (KL) divergence between the output from the neural transducer in training and the supervisory output.

12. The computer program product of claim 4, wherein the updating parameters is performed by minimizing a mean square error between the output from the neural transducer in training and the supervisory output.

13. The system of claim 7, wherein the updating parameters is performed by minimizing a Kullback-Leibler (KL) divergence between the output from the neural transducer in training and the supervisory output.

14. The system of claim 7, wherein the updating parameters is performed by minimizing a mean square error between the output from the neural transducer in training and the supervisory output.

15. The computer-implemented method of claim 1, wherein the posterior lattice output of the neural transducer in training is determined continuously from previous tokens based on previous data.

16. The computer program product of claim 4, wherein the posterior lattice output of the neural transducer in training is determined continuously from previous tokens based on previous data.

17. The system of claim 7, wherein the posterior lattice output of the neural transducer in training is determined continuously from previous tokens based on previous data.

* * * * *